US012585244B2

(12) United States Patent
Giessauf et al.

(10) Patent No.: US 12,585,244 B2
(45) Date of Patent: Mar. 24, 2026

(54) COMPUTER-IMPLEMENTED METHOD FOR PROCESSING A PLURALITY OF PROCESS VARIABLES OF A PRODUCTION CELL

(71) Applicant: ENGEL AUSTRIA GmbH, Schwertberg (AT)

(72) Inventors: Josef Giessauf, Perg (AT); Herwig Koppauer, Linz (AT); Georg Pillwein, Linz (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 546 days.

(21) Appl. No.: 17/856,068

(22) Filed: Jul. 1, 2022

(65) Prior Publication Data

US 2023/0004144 A1 Jan. 5, 2023

(30) Foreign Application Priority Data

Jul. 2, 2021 (EP) ..................................... 21183477

(51) Int. Cl.
*G05B 19/4155* (2006.01)

(52) U.S. Cl.
CPC ..................... *G05B 19/4155* (2013.01); *G05B 2219/35066* (2013.01)

(58) Field of Classification Search
CPC .............. G05B 13/042; G05B 19/4083; G05B 19/41875; G05B 19/042; G05B 19/18; G05B 19/4099; G05B 2219/32291; G05B 2219/33109; G05B 2219/33122; G05B 2219/42152; G05B 2219/49007; G05B 2219/49061; G05B 23/0294
See application file for complete search history.

(56) References Cited

U.S. PATENT DOCUMENTS

| | | | |
|---|---|---|---|
| 9,842,372 B2 | 12/2017 | Kaufman | |
| 10,372,118 B2 | 8/2019 | Li et al. | |
| 10,976,719 B2 * | 4/2021 | Matsukura | ......... G05B 19/4083 |
| 11,241,811 B2 | 2/2022 | Giessauf | |
| 2003/0045964 A1 * | 3/2003 | Lottgen | ............... G05B 19/409 |
| | | | 700/173 |

(Continued)

FOREIGN PATENT DOCUMENTS

| | | |
|---|---|---|
| CN | 112839790 A | 5/2021 |
| EP | 3 551 420 | 1/2021 |
| EP | 3 804 951 | 4/2021 |

*Primary Examiner* — Darrin D Dunn
(74) *Attorney, Agent, or Firm* — Wenderoth, Lind & Ponack, L.L.P.

(57) ABSTRACT

A computer-implemented method using a processing unit and including providing to or determining by the processing unit a totality of process variables which is available for processing for the plurality of actuators and/or sensors of a subunit, using the processing unit to determine a subset of process variables out of the totality of process variables processing, during production of a production lot, those process variables which belong to the determined subset of process variables for those process variables which do not belong to any of the determined subset of process variables, and processing a selected number of process variables. In addition, a production cell has a processing unit configured to carry out the computer-implemented method, and computer program is provided to implement such a method.

22 Claims, 19 Drawing Sheets

(56) References Cited

U.S. PATENT DOCUMENTS

| | | | |
|---|---|---|---|
| 2010/0057410 A1* | 3/2010 | Yanami | G06F 30/00 |
| | | | 703/2 |
| 2014/0277794 A1 | 9/2014 | Kaufman | |
| 2016/0110657 A1* | 4/2016 | Gibiansky | G06N 20/00 |
| | | | 706/12 |
| 2018/0088567 A1 | 3/2018 | Li et al. | |
| 2019/0018559 A1* | 1/2019 | Miles | G06F 3/04847 |
| 2019/0079472 A1* | 3/2019 | Hou | G05B 9/02 |
| 2019/0171776 A1* | 6/2019 | Huang | G06N 7/01 |
| 2020/0391422 A1 | 12/2020 | Giessauf | |
| 2021/0308918 A1 | 10/2021 | Niewels et al. | |
| 2024/0219891 A1* | 7/2024 | Reisch | G05B 19/41875 |
| 2024/0349392 A1* | 10/2024 | Luo | H04W 24/08 |

* cited by examiner $p_1$ $p_9$ T $p_9$ $p_8$ $p_7$ $p_6$ $p_1$

5

$S_2$ $S_1$

COMPUTER-IMPLEMENTED METHOD FOR PROCESSING A PLURALITY OF PROCESS VARIABLES OF A PRODUCTION CELL

BACKGROUND OF THE INVENTION

The invention is in the field of using computer-implemented methods for processing a plurality of process variables of a production cell comprising at least one shaping machine as a subunit of the production cell.

The at least one subunit can have a plurality of actuators and/or sensors, which define a totality of process variables in the form of all process variables that can be ascertained from the measurement values (or can be in the form of a measurement value or values themselves) for the plurality of actuators and/or sensors of the at least one subunit or in the form of a static, pre-selected subset of process variables.

In the context of the present disclosure an actuator is understood to be any component of a machine that is responsible for moving and/or controlling a mechanism or system.

Usually, sensors are used to capture measurement values. In some embodiments, an actuator can be used to measure a process variable. By way of example, for an actuator in the form of an electric motor it is possible to measure the current provided to the actuator and to conclude therefrom a force (process variable) exerted by the actuator.

In the prior art, all of the process variables belonging to the totality of process variables are processed by at least one processing unit during operation of the production cell.

It is therefore a problem of the prior art that the totality of process variables for a given plurality of actuators and/or sensors, which is very large, results in high demands for processing capacity (memory requirement, computing power and communication bandwidth) and the risk to overload an operator of the production cell with too much information which, although it is provided to the operator based on the totality of process variables, is not relevant for the operator to the full extent.

SUMMARY OF THE INVENTION

It is an object of the invention to provide an improved computer-implemented method for processing a plurality of process variables of a production cell comprising at least one shaping machine as a subunit of the production cell, using at least one processing unit, having reduced demands for processing capacity and the risk to overload an operator of the production cell with too much information.

It is another object of the invention to provide a production cell in which an improved computer-implemented method for processing a plurality of process variables of a production cell comprising at least one shaping machine as a subunit of the production cell, using at least one processing unit is implemented, having reduced demands for processing capacity and a reduced risk to overload an operator of the production cell with too much information.

It is yet another object of the invention to provide a computer program to implement an improved computer-implemented method for processing a plurality of process variables of a production cell comprising at least one shaping machine as a subunit of the production cell, using at least one processing unit.

It is an advantage of the invention that, although the totality of process variables for a given plurality of actuators and/or sensors is very large, only selected process variables out of the totality of process variables are processed thereby lowering demands for processing capacity (with respect to memory requirement, computing power and communication bandwidth) and reducing the risk to overload an operator of the production cell with too much information which, although it could be provided based on the totality of process variables, is not relevant for the operator to the full extent.

The invention provides a computer-implemented method for processing a plurality of process variables of a production cell which comprises at least one shaping machine as a subunit of the production cell, the method using at least one processing unit and comprising at least the steps of:

a. for at least one subunit of the production cell, the at least one subunit having a plurality of actuators and/or sensors, providing to or determining by at least one processing unit a totality of process variables which is available for processing (for the plurality of actuators and/or sensors of the at least one subunit)

b. using at least one processing unit to determine at least one subset of process variables out of the totality of process variables c. processing, preferably during production of a production lot, those process variables which belong to the determined at least one subset of process variables d. for those process variables which do not belong to any of the determined at least one subset of process variables, processing a selected number of process variables (preferably this number is zero or smaller than the number of the totality of process variables minus the number of process variables belonging to any of the determined at least one subset of process variables)

In accordance with the invention only the following process variables out of the totality of available process variables have to be processed:

Those process variables which belong to the at least one determined subset of process variables, these are process variables that are either judged automatically by the at least one processing unit to be of interest with respect to the criteria given below and/or have been indicated by an operator of the production cell to be of interest. Although in rare cases it might happen that, e.g., for a specific production lot, all of the process variables of the totality of process variables belong to the at least one determined subset of process variables, this will normally not be the case.

The selected number of process variables which, although they do not belong to the at least one determined subset of process variables, are nevertheless processed, e.g., for the reasons given below. Usually, it will be the case that this number is zero or smaller than the number of the totality of process variables minus the number of process variables belonging to any of the determined at least one subset of process variables.

In summary, the invention will usually have the effect that only some of the process variable of the totality of process variables, but not all of them, have to be processed by the at least one processing unit. In other words, there is a reduction of process variables to be processed compared to the totality of process variables that could be processed.

Of course, it is possible that the at least one determined subset of process variables and/or the selected number of process variables which are processed although they do not belong to the at least one determined subset of process variables is different from production lot to production lot for one and the same process cell.

In some embodiments the production cell comprises, in addition to the at least one shaping machine, at least one further subunit in the form of at least one of the following:

at least one other shaping machine at least one mold mounted on the at least one shaping machine at least one handling device, e.g., for handling products produced by the at least one shaping machine at least one periphery device, preferably: temperature control device, material dryer, material feeder, media manifold, dosing unit, mixing device, quality control device infrastructure for the production cell In some embodiments, in step (b), the at least one processing unit determines at least one of the at least one subset of process variables based on at least one of the following criteria:

configuration of the at least one subunit of the production cell history of the at least one subunit of the production cell configuration and/or history of a plurality of other production cells physical or logical dependencies of values, preferably key figures, derived from at least one process variable and/or signals to be provided by the method to an operator operator input In some embodiments, in step (c), processing process variables, which belong to the determined at least one subset of process variables and/or, in step (d), belonging to the selected number of process variables, comprises:

capturing or measuring process variables in form of measurement values, and/or calculating values or properties of process variables over time, preferably key figures, derived from at least one process variable, and/or generating signals to be provided by the method to an operator, and/or executing data analysis, preferably inspecting, transforming, modeling, interpreting, classifying or visualizing data, and/or storing values or properties of process variables over time, and/or storing calculated values and/or generated signals outputting values or properties of process variables over time, and/or outputting calculated values and/or generated signals In some embodiments, in step (d), the number of process variables which do not belong to any of the determined at least one subset of process variables, but are processed, comprises at least one process variable which is:

processed at a lower frequency than those process variables which belong to at least one of the determined at least one subset, and/or observed by at least one processing unit to decide whether it should be included in an updated version of at least one of the determined at least one subset In some embodiments, in step (d), the number of process variables which do not belong to any of the determined at least one subset of process variables, but are processed, can be selected according to at least one of the following criteria:

values of configuration variables history of determined subsets of process variables for this production cell and/or other production cells history of generated signals which were provided by the method to an operator for this production cell and/or other production cells

In some embodiments at least one of the at least one processing unit is comprised by:

an edge device a control unit of one of the subunits of the production cell or of the production cell a central server of a production site containing the production cell a stationary or mobile computing device a cloud computing device A reference value can be any value which is used for a comparison with a process variable. A given reference value can be provided for a plurality of process variables or it is possible to provide a specific reference value for each process variable. In some embodiments at least one reference value is selected from the following list, wherein it is possible to combine at least two, or even all, of the following list entries:

one or more time-preceding value or values of the selected process variable, for example a value which directly preceded in respect of time of the selected process variable or a drift or scatter a value of the selected process variable, stored by the operator at a given time a value calculated from a number of process variables a target value for the selected process variable an ideal value, determined by an expert system, for the selected process variable, and a variable, for example drift or scatter, calculated from the current value of the selected process variable and/or one or more preceding values in respect of time of a process variable A combination of the above list entries can be referred to as the reference state of the production process.

For a cyclically operating shaping machine, process variables of a current working cycle do not necessarily have to be compared to those from preceding working cycles but the process variables (which do not imperatively have to refer to a working process) can also be ascertained at certain time intervals. In that way, e.g., it is possible to observe heating operations in which no working cycle at all is implemented. In that case the ascertained values for temperatures or volume flows of temperature control media would be a suitable basis for key figures which for example are ascertained every 10 seconds.

It is preferably provided that time-discrete ascertainment of the values of the plurality of selected process variables is affected in one of the ways set out hereinafter:

for a succession of production processes, preferably in each cyclic production process upon the occurrence of a predefined event, for example each time the predefined event occurs the step of determining a new value is affected at predetermined time intervals (e.g., a new value every x seconds)

The measures defined in the preceding paragraph can also be provided in relation to determining the deviation or the rate of change.

In some embodiments at least some process variables are, preferably each process variable is, associated with at least one logical group, wherein there are provided at least two different logical groups.

With respect to the concept of logical groups reference is made to EP 3 551 420 B1, EP 3 804 951 A1, and US 2020/391 422 A1, the contents of which is hereby incorporated by reference.

In some embodiments the logical groups are formed in accordance with at least one of the criteria in the following list:

subunits, installation region or components of the production cell (for example shaping machine with closing unit, injection unit, tool, back-flow blocking means and so forth; mold mounted on the shaping machine, handling device, periphery device, infrastructure, . . . )

procedural step or state of a production process (for example closing a mold, plasticizing of material, injecting material into the mold, opening the mold, extracting shaped parts, . . . )

properties of a molding material (e.g., thermoplastic material) being processed by the shaping machine physical units (process variables having the same physical units)

properties of a shaped part produced by the shaping machine possible disturbances or errors in the production process the existence of a desired state (e.g., whether closing behavior of the blocking means is as expected)

productivity and economic efficiency environmental conditions input data required for processing an algorithm By way of example, grouping in logical groups can be affected for example in accordance with:

process steps in the production cycle subunits in the production cell, especially the shaping machine physical variables of the production process or measures for preparation in relation to the production process (e.g., preheating of components of the shaping machine)

Especially adapted to a shaping machine in the form of an injection molding machine, the logical groups can be formed or provided as follows in relation to process steps, function units or physical variables:

The logical groups in relation to process steps in the production cycle can be (individually or in any combination):

logical group in relation to the process step 'drying and conveying plastic material into at least one plasticising unit of the injection molding machine', e.g., referred to as 'drying and conveying' logical group in relation to the process step 'plasticising of the conveyed plastic material in the at least one plasticising unit of the plastic injection molding machine', e.g., referred to as 'melting plastic' logical group in relation to the process step 'injection of the plasticised plastic material into at least one cavity of the plastic injection molding machine', e.g., referred to as 'filling mold' logical group in relation to the process step 'cooling and removing and/or ejecting the shaped part produced by hardening of the plasticised plastic material injected into the at least one cavity', e.g., referred to as 'mold and removal' logical group in relation to the process step 'closing and opening at least two tool portions fixed to mold mounting plates of the plastic injection molding machine, by which the at least one cavity can be formed', e.g., referred to as 'closing and opening'

The logical group 'drying and conveying' can include, e.g., the process variables 'temperature of the plastic material', 'moisture content of the plastic material'.

The logical group 'melting plastic' can include, e.g., the process variables 'temperature of the plasticised plastic material', 'power of a temperature control device of the plasticising unit', 'dynamic pressure in the space in front of the screw of the plasticising screw', 'rotary speed and/or torque of the plasticising screw'.

The logical group 'filling mold' can include, e.g., the process variables 'injection pressure', 'screw advance speed of the plasticising screw'.

The logical group 'mold and removal' can include, e.g., the process variables 'tool internal pressure', 'tool temperature', 'hot runner temperature', 'power of a temperature control device of the mold tool'.

The logical group 'closing and opening' can include, e.g., the process variables 'closing force with which the tool portions can be pressed against each other by way of the mold mounting plates during injection', 'closing force distribution', 'separating force with which the mold parts are moved away from each other after hardening of the shaped part', 'stamping stroke when using a stamping tool'.

The logical groups in relation to function units of the production installation can be, e.g., (individually or in any combination):

logical group in relation to 'plastic injection molding machine' logical group in relation to 'closing unit of the plastic injection molding machine' logical group in relation to 'injection unit of the plastic injection molding machine' logical group in relation to 'rapid stroke device of the closing unit' logical group in relation to 'closing mechanism of the closing unit' logical group in relation to 'mold tool' logical group in relation to 'ejection device of the mold tool' logical group in relation to 'temperature control device of the mold tool' logical group in relation to 'plasticising unit of the injection unit' logical group in relation to 'metering drive of the plasticising unit' logical group in relation to 'injection drive of the plasticising unit' logical group in relation to 'handling apparatus for the plastic injection molding machine'

As it is clear to the person skilled in the art how the variables discussed above in relation to the logical groups for the process steps can be associated in relation to the logical groups for the function units, a corresponding explanation is dispensed with here.

The logical groups in relation to the physical variables of the production process can be, e.g., (individually or in any combination): logical group in relation to 'temperature', 'pressure', 'travel', 'volume', 'rotary speed', 'speed', 'force', 'time', 'power', 'torque' and so forth.

In some embodiments it is provided that each selected process variable is associated with at least one logical group, wherein there are provided at least two different logical groups, and for each logical group a state of the logical group is evaluated and/or visualised on the basis of the process variables associated with that logical group.

In these embodiments it is preferably provided that logical groups are arranged in at least two hierarchy levels in such a way that at least one logical group of a lower hierarchy level is associated with another logical group of a higher hierarchy level.

By grouping and accumulation of the information the method can be scaled by production cells or generalised to production facilities or production locations.

For example, it can be preferred that in a (preferably uppermost) hierarchy level the logical groups are selected in relation to process steps in a production cycle in a lower (preferably next lower) hierarchy level the logical groups are selected in accordance with function units of the production installation, and in a further lower (preferably lowermost) hierarchy level the logical groups are selected in accordance with physical parameters The logical groups of an upper hierarchy level can therefore contain logical groups of one or more lower hierarchy levels.

For example, being specifically adapted to a plastic injection molding machine, it can be provided that:

a hierarchy level contains those logical groups which were selected in relation to 'process steps of the production cycle' a lower hierarchy level for each of the logical groups of the upper hierarchy level contains those logical groups which were selected in relation to the 'function units of the production cell but only for those function units of the production cell which are involved in the respective process step, and a further lower hierarchy level for each of the logical groups of the upper hierarchy level contains those logical groups which were selected in relation to 'physical variables of the production process' but only for those physical groups which are relevant in relation to the selected function unit It can be provided that, if the deviation of a key figure of a group exceeds a predetermined value, an action is triggered, for example a message is output to the operator in relation to the logical group in question.

Bringing together the evaluation of individual process variables in a plurality of hierarchy levels gives an overall overview about the state of the process, starting from which the operator can provide the desired information along the hierarchical structure in various planes to the individual process variables, or the visualisation device automatically represents those items of information to the operator. In relation to an evaluation with or without visualisation the advantage is that actions which are to be carried out automatically can be better defined.

In embodiments which use logical groups it is preferably provided that in step (b) the at least one processing unit determines at least some of the process variables of the at least one subset of process variables out of the totality of process variables on basis of the logical structure given by the logical groups, preferably given by the hierarchical levels of logical groups.

In embodiments, which use logical groups, it is preferably provided that the at least one processing unit determines at least some of the process variables of the at least one subset of process variables such that all process variables belonging to a logical group are included in the at least one subset.

By way of example, it can be determined by at least one processing unit that a specific logical group is not of interest and, consequently, all logical groups connected across the hierarchical levels by their assignment to the specific logical group are not of interest either. Consequently, the process variables of the lowest hierarchical level do not have to be processed (these process variables do not belong to a determined subset). This can be called "top-down-approach".

By way of another example, it can be determined by at least one processing unit that a specific process variable is not of interest (does not belong to a determined subset) and is consequently not processed. Consequently, across hierarchical levels, all of the logical groups for which the at least one processing unit needs the specific process variable as required input to determine the state of that logical group are not processed. This can be called "bottom-up-approach".

Both approaches can be used, either alternatively or in combination.

In embodiments, which use logical groups, it is preferably provided that, continuously or in time-discrete relationship, the value of a plurality of process variables is processed, and for each logical group a state of the logical group is evaluated by the at least one processing unit on the basis of the process variables associated with said logical group, and is preferably visualised by means of a display device, and wherein the state of logical groups is evaluated only for those logical groups for which all of the process variables necessary to evaluate their state belong to at least one of the at least one subset of process variables.

In these embodiments it can be provided that in order to evaluate the state of a logical group the respective current value of each process variable, or a variable derived therefrom, is compared to one or more reference values by means of at least one processing unit and a deviation or a rate of change is determined.

In the case of hierarchically arranged logical groups it is preferred that the state of each logical group is evaluated and evaluation of all logical groups that are connected across the hierarchical levels by their assignment comes to the same result. This means that if, e.g., the state of a specific process variable is evaluated to be critical, this can be seen by an operator at the highest hierarchy level, and it is not necessary for the operator to work through all hierarchy levels, if the operator is not interested in the more detailed information available at the lower hierarchical levels.

It should be noted that the association between process variables and logical groups does not need to be static but could be subject to change over time, e.g., in dependence on a change of:

configuration of the at least one subunit of the production cell history of the at least one subunit of the production cell configuration and/or history of a plurality of other production cells operator input Preferably the at least one shaping machine is a cyclically operating machine, preferably an injection-molding machine, an injection press, or a compounder or a continuously operating machine, preferably an extruder.

BRIEF DESCRIPTION OF THE DRAWINGS

Embodiments of the invention are discussed on basis of the attached Figures in which.

DETAILED DESCRIPTION OF THE INVENTION

Figure 1:
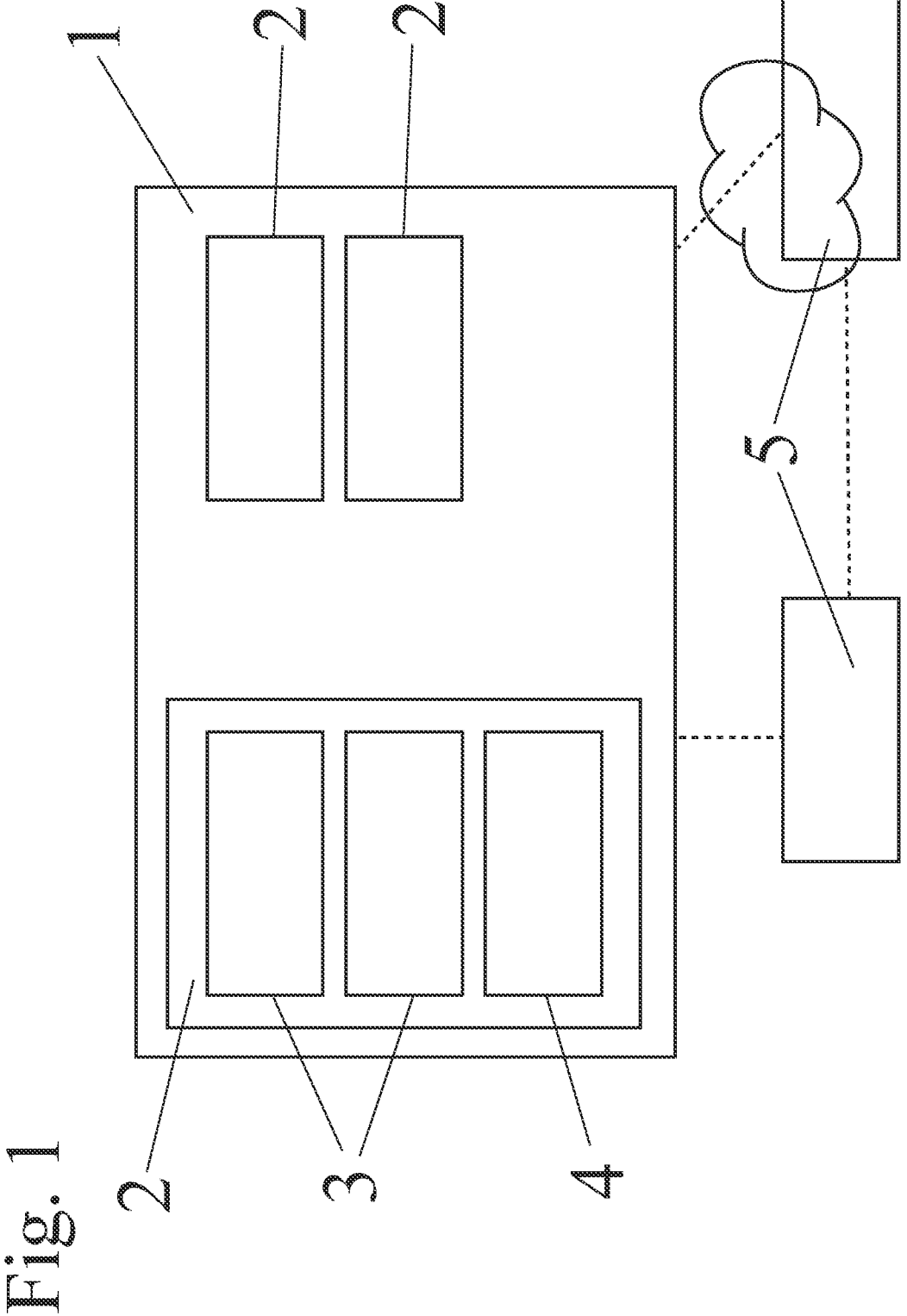
FIG. 1 shows a schematic drawing of a production cell having different subunits which have different actuators and sensors.

In FIG. 1 a production cell 1 comprising, by way of example, three subunits 2, one of which is a shaping machine, is shown. Each subunit 2 has actuators 3 and sensors 4 which are connected to at least one processing unit 5 (by way of example, two processing units 5 are shown).

Figure 2:
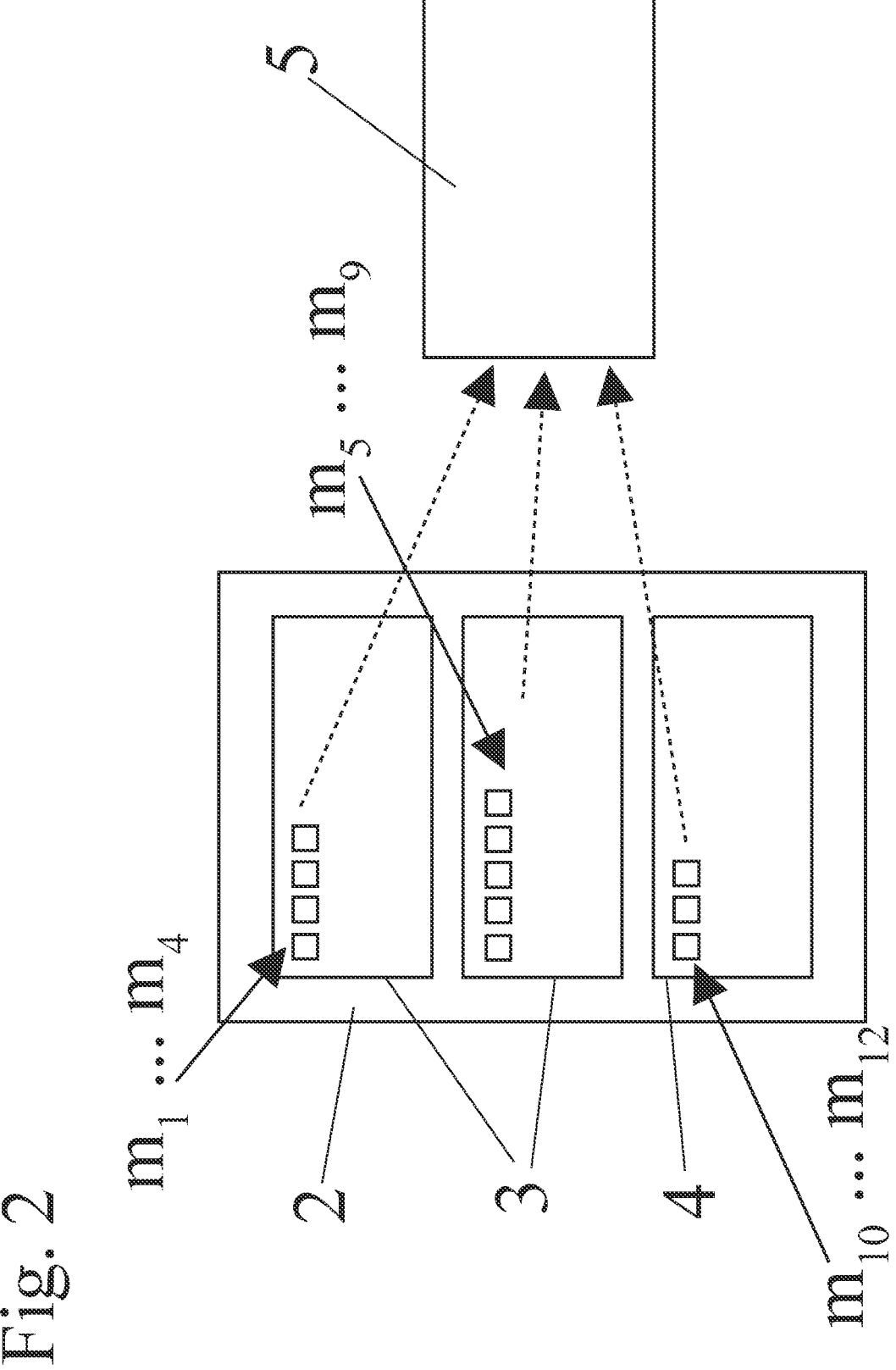
FIG. 2 shows schematically the flow of information between actuators, sensors and a processing unit.

FIG. 2 shows only some of these connections for some of the actuators 3 and sensors 4 of an exemplary subunit 2. The connections are used to communicate a plurality of measurement values $m_i$ to a processing unit 5.

Figure 3:
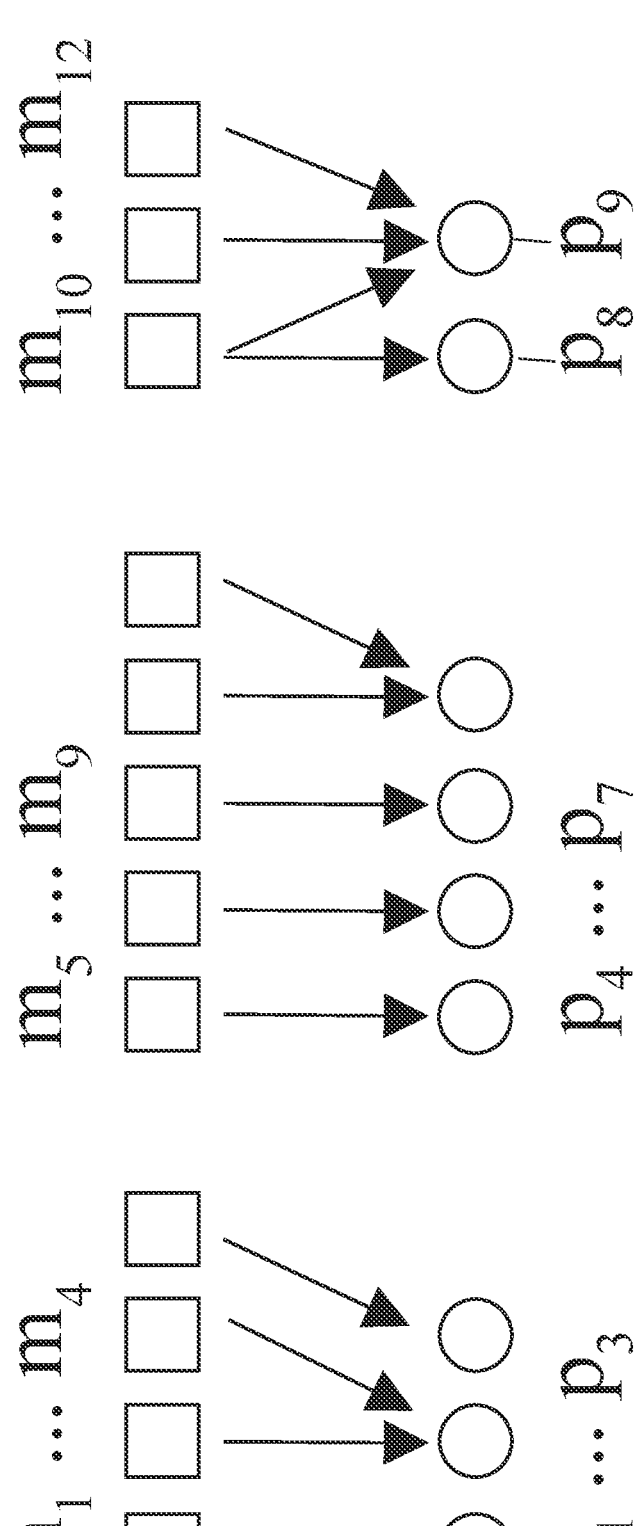
FIG. 3 shows how different process variables are ascertained from different measurement values.

FIG. 3 shows how different process variables $P_i$ are processed based on different measurement values $m_i$.

Figure 4:
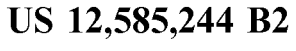
FIG. 4 shows a totality of process variables from which two subsets of process variables are chosen by way of example.
Figure 5:
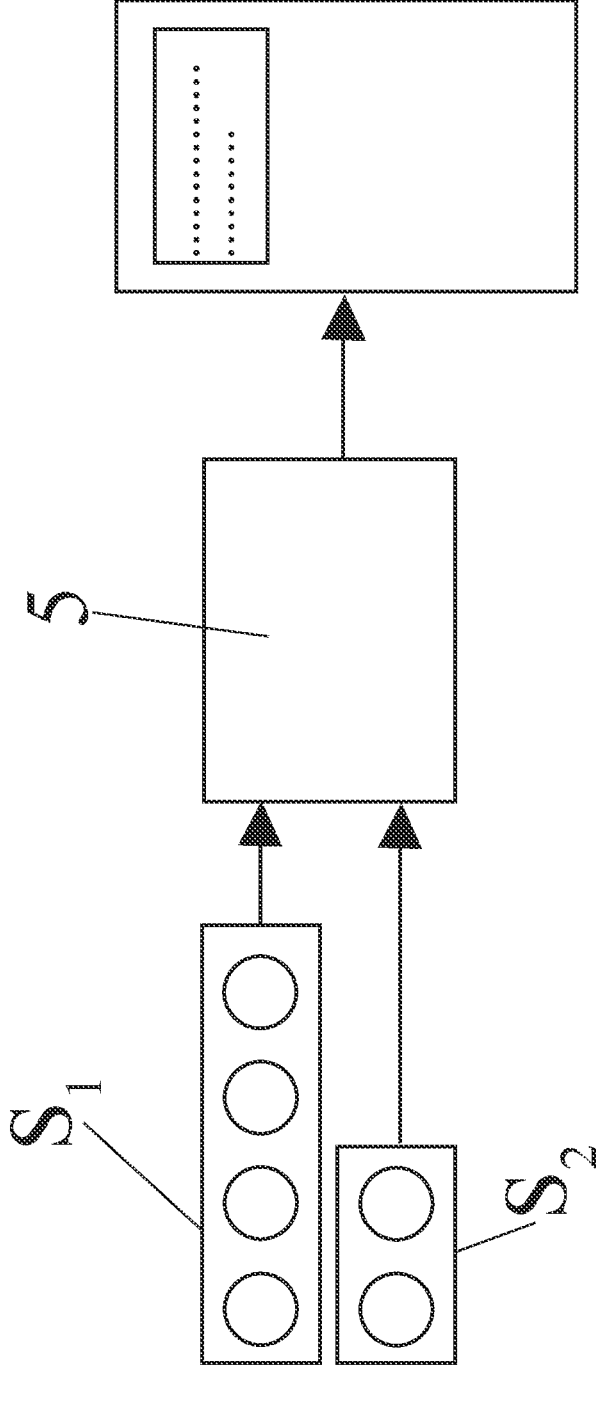
FIG. 5 shows how a processing unit uses determined subsets for processing process variables in order to generate output, here in the form of a signal for an operator.
Figure 12:
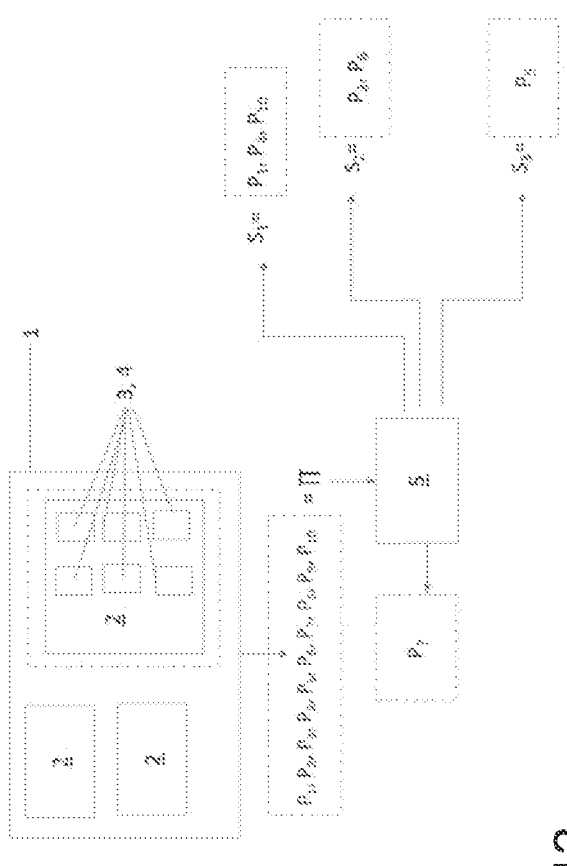
FIG. 12 shows a schematic example of the inventive method.

FIG. 4 shows an example for step (b) of a computer-implemented method according to the invention (cf. also FIG. 12). Out of a totality $\Pi$ of process variables $P_i$ a processing unit 5 determines at least one subset $S_i$ of process variables $P_i$. In step (c), during production of a production lot, those process variables $P_i$ which belong to the determined at least one subset $S_i$ of process variables $P_i$ are processed, e.g., in order to calculate values or properties of process variables $P_i$ over time, preferably key figures, derived from at least one process variable $P_i$, and/or to generate signals to be provided by the method to an operator, and/or to store calculated values and/or generated signals (cf. FIG. 5).

Figure 6:
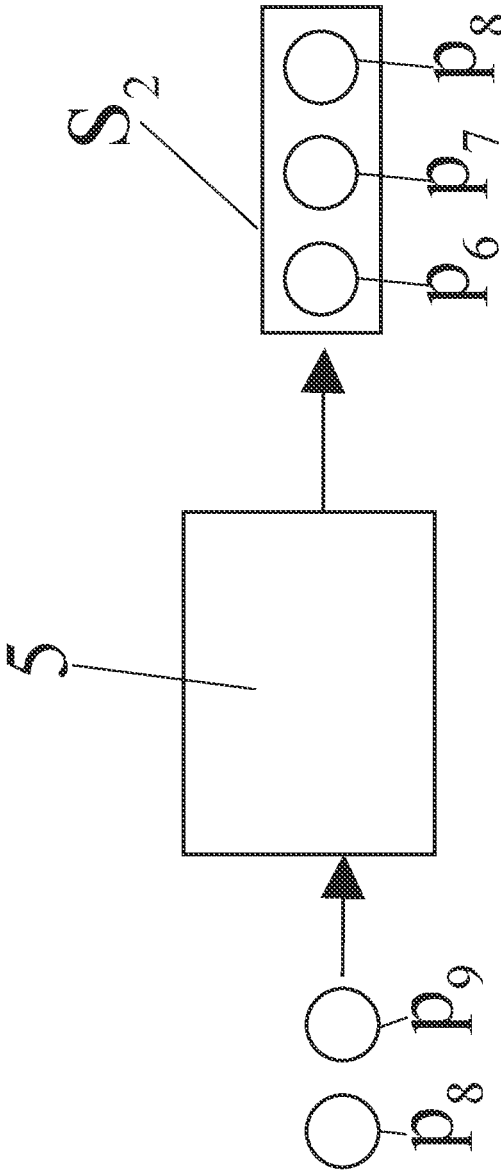
FIG. 6 shows an example in which a processing unit decides to include a process variable not included in a subset in an updated version of the subset.

In the example of FIG. 4 two subsets $S_1$ and $S_2$ are determined and two process variables $P_8$, $P_9$ belong to the complement $C = \Pi \backslash (S_1 \cup S_2)$. In step (c) of the method all process variables $P_1, \ldots, P_7$ which belong to one of the subsets $S_1$ and $S_2$ are processed. With respect to the process variables $P_8$, $P_9$ belonging to the complement $C$ it is preferred that they are not processed. Alternatively, it would be possible to:

process them at a lower frequency than those process variables $P_1, \ldots, P_7$ which belong to at least one of the determined subsets $S_1$ and $S_2$, and/or observe them by at least one processing unit 5 to decide whether either one of them should be included in an updated version of at least one of the subsets $S_1$ and $S_2$ (cf. FIG. 6)

It can be provided that at least some process variables $P_i$ are, preferably each process variable $P_i$ is, associated with at least one logical group 6, wherein there are provided at least two different logical groups 6, and logical groups 6 are arranged in at least two hierarchy levels in such a way that at least one logical group 6 of a lower hierarchy level is associated with another logical group 6 of a higher hierarchy level.

Figure 7:
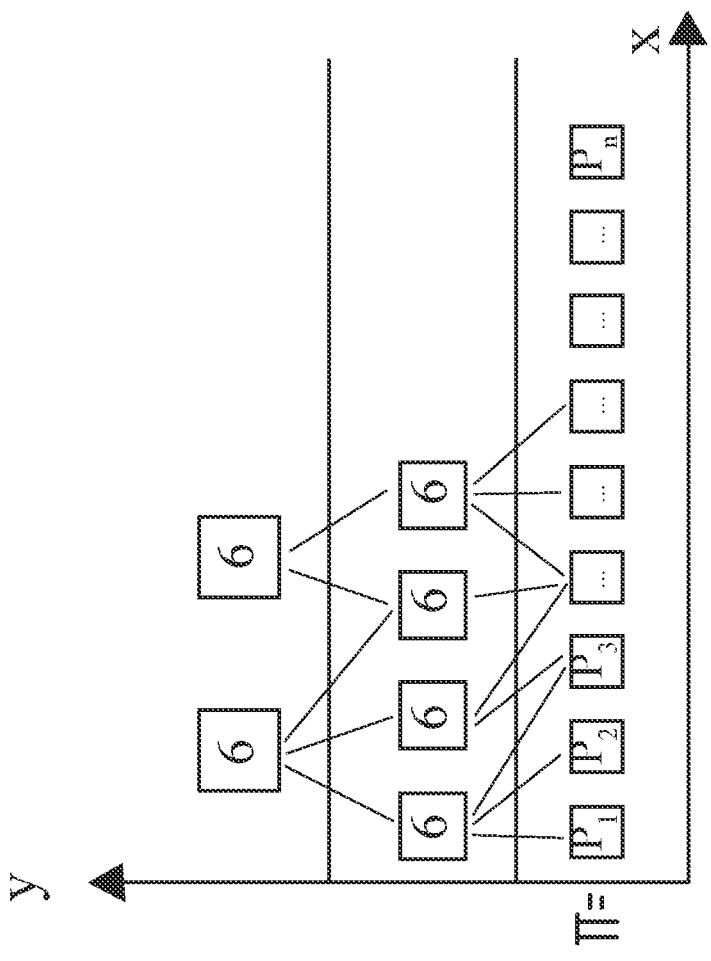
FIG. 7 shows logical groups arranged in hierarchical levels.

In the example shown in FIG. 7 the hierarchical structure (a plurality of hierarchical levels) is shown along axis Y. At the lowest level the totality $\Pi$ of process variables $P_i$ is shown. At the next level logical groups 6 belonging to the lowest hierarchical level are shown. At the highest-level logical groups 6 belonging to the highest hierarchical level are shown.

It can be seen that different process variables $P_i$ are processed with respect to different logical groups 6. Also, different logical groups 6 can have different numbers of process variables $P_i$ connected to them.

It is preferred that, continuously or in time-discrete relationship, the value of a plurality of process variables $P_i$ is processed, and for each logical group 6 a state of the logical group 6 is evaluated by at least one processing unit on the basis of the process variables $P_i$ associated with said logical group 6 and is preferably visualised by means of a display device.

Bringing together the evaluation of individual process variables $P_i$ in a plurality of hierarchy levels gives an overall overview about the state of the process, starting from which the operator can provide the desired information along the hierarchical structure in various planes to the individual process variables $P_i$, or a visualization device automatically represents those items of information to the operator.

Figure 8:
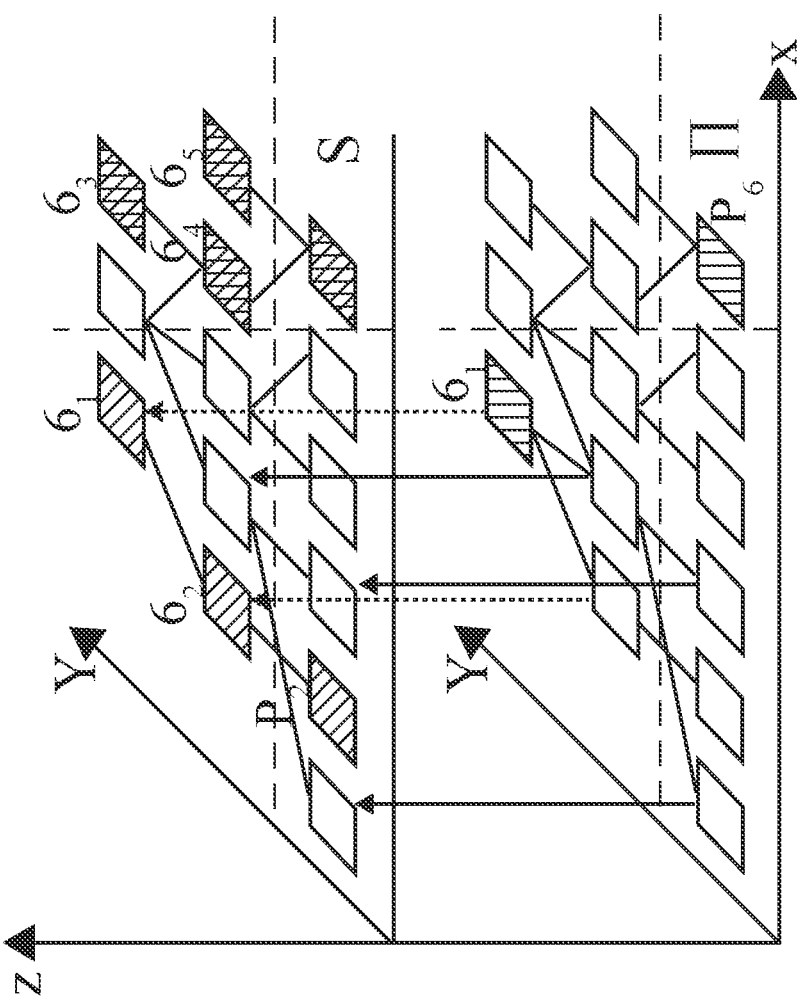
FIG. 8 shows a three-dimensional representation of process variables on basis of the logical structure given by the hierarchical levels of logical groups.
Figure 9A:
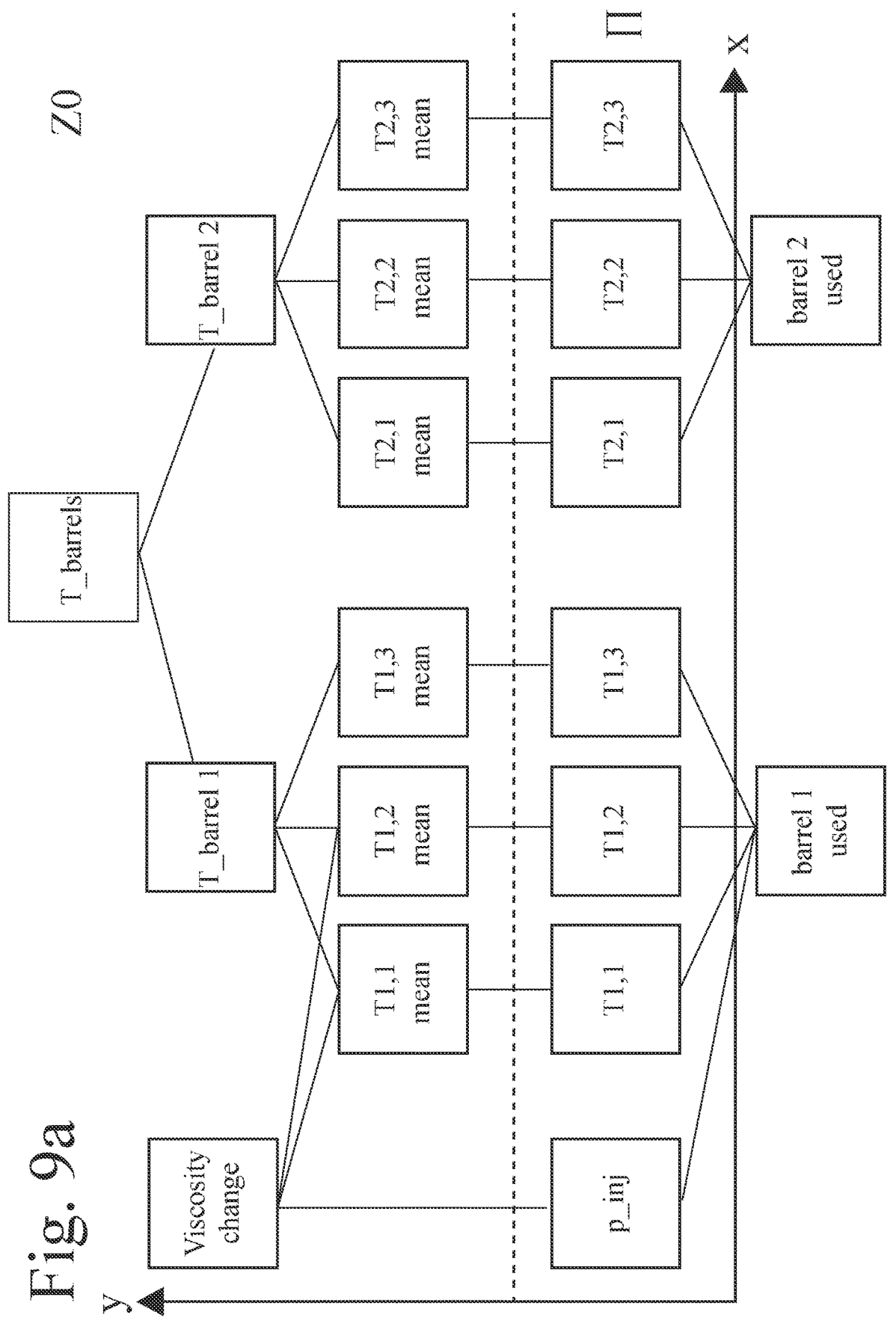
FIG. 9*a-e* shows a first example of the inventive method.
Figure 9B:
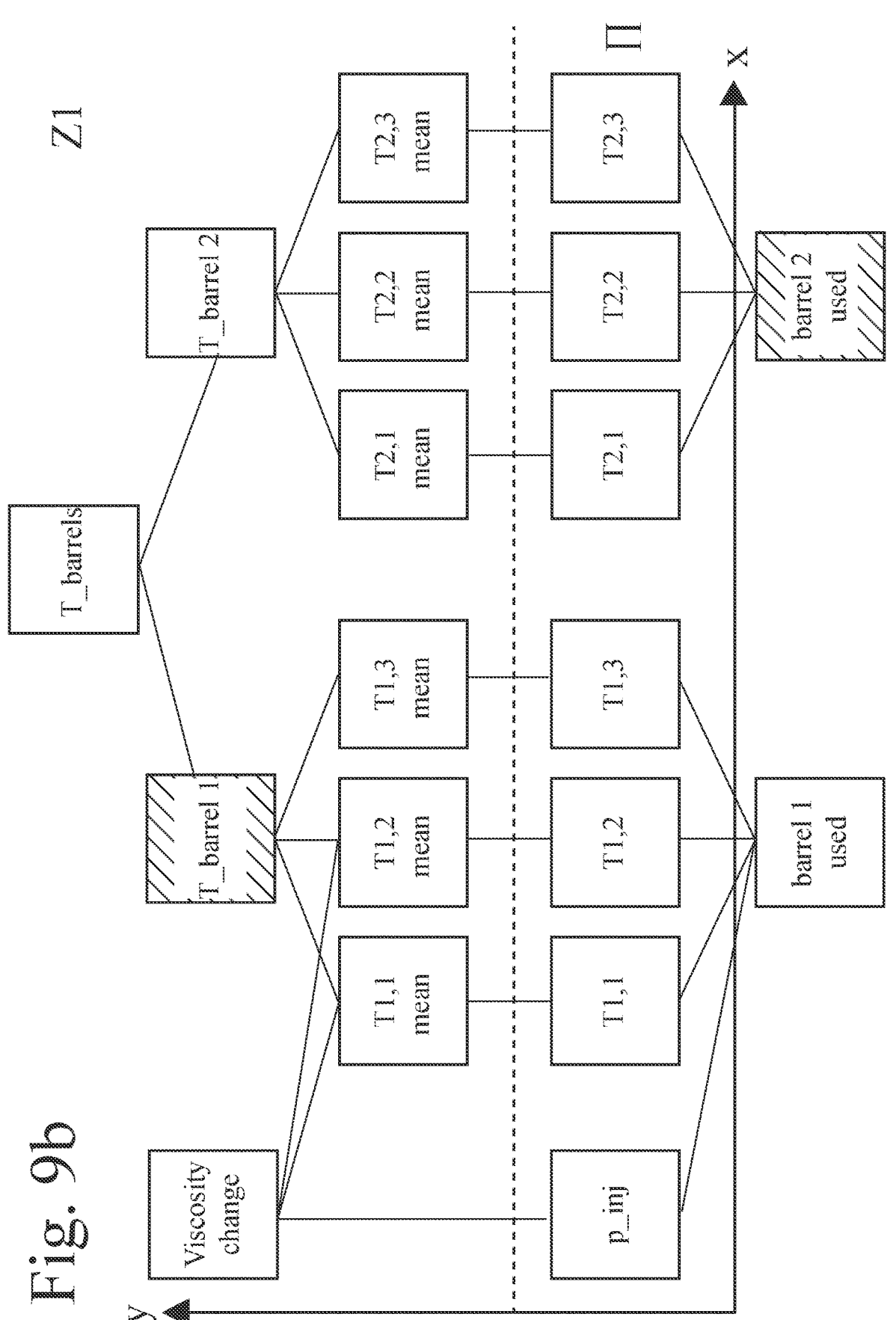
Figure 9C:
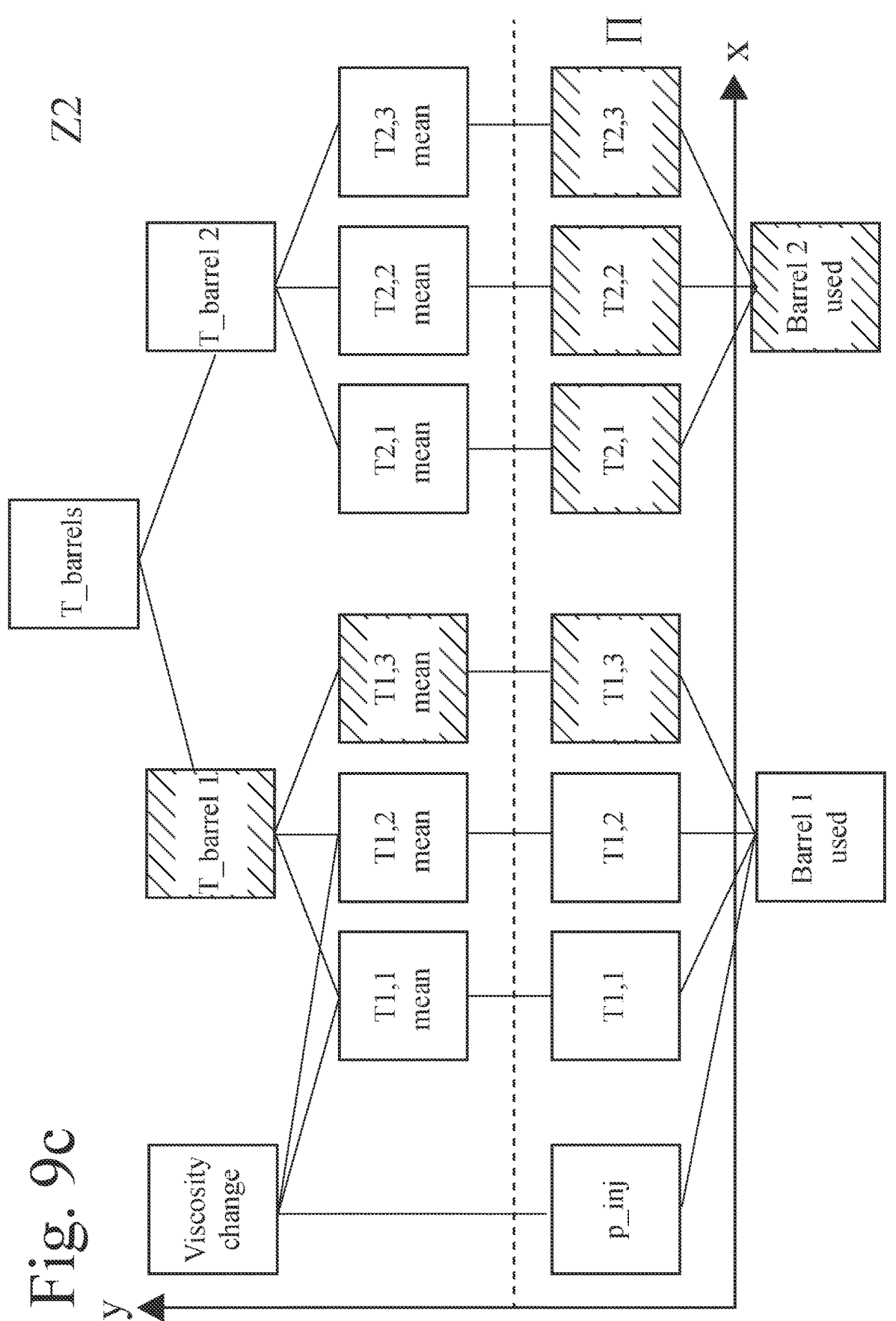
Figure 9D:
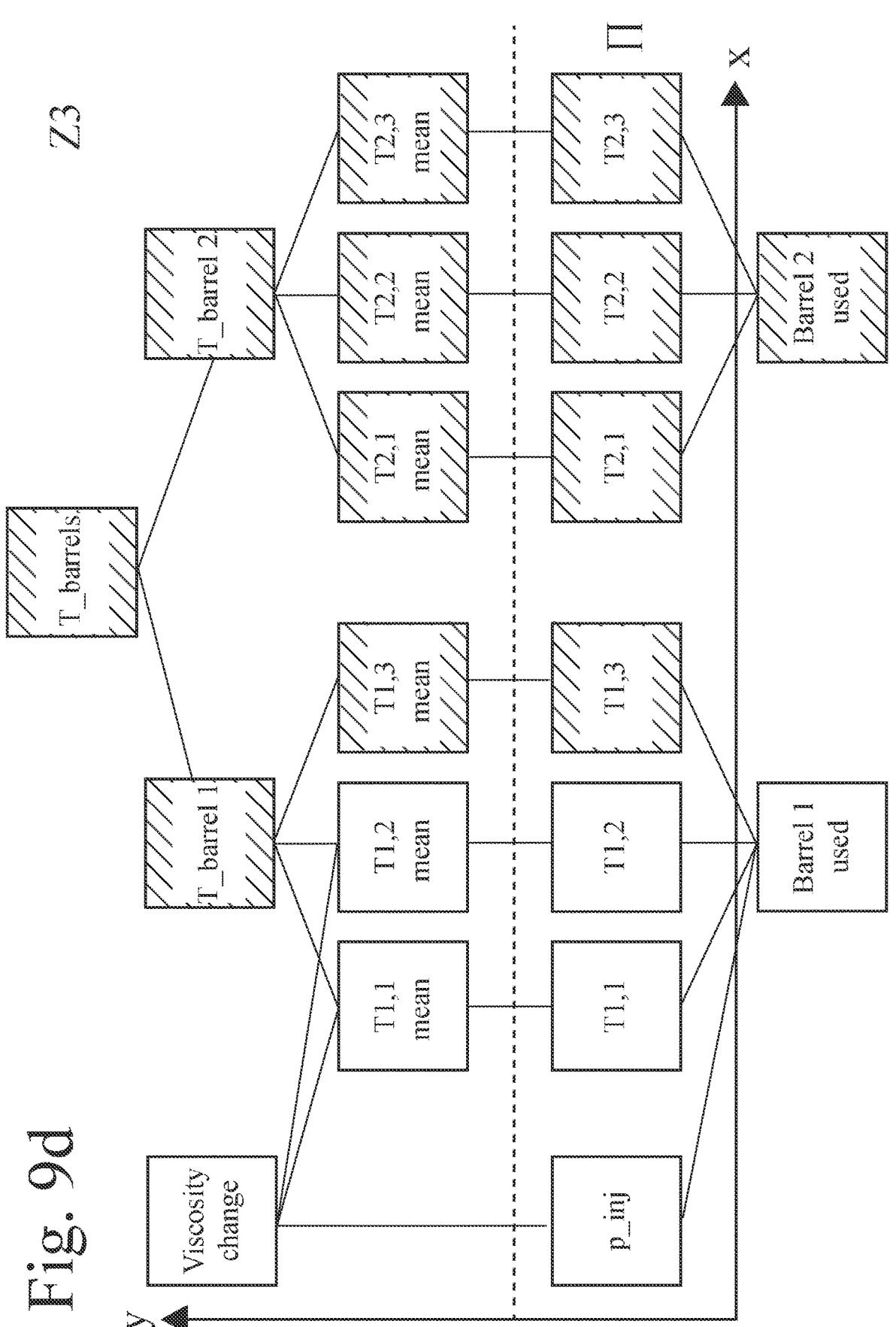
Figure 9E:
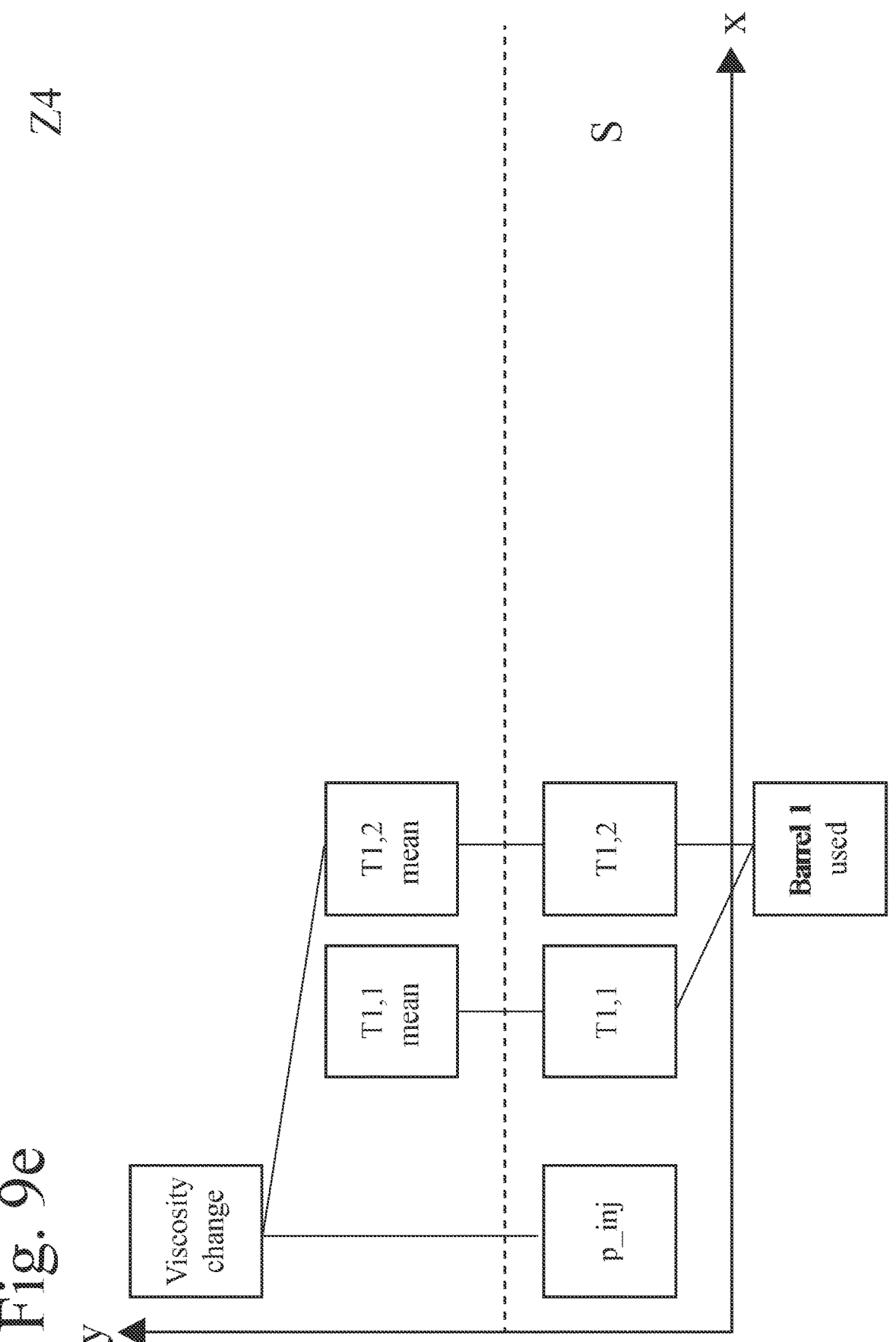

FIG. 8 shows a three-dimensional representation (having axes X, Y, Z) of process variables $P_i$ on basis of the logical structure given by the hierarchical levels of logical groups 6 (X-Y plane) and on basis of a determined subset $S_i$ (along the Z axis).

In this Figure two different principles (top-down-approach and bottom-up-approach with respect to the Y axis) are shown which can be used alternatively or in combination:

On the left side of FIG. 8 it is determined by a processing unit 5 that logical group $6_1$ is not of interest and consequently the logical group $6_2$ belonging to a lower hierarchical level and the process variables $P_i$ of the lowest hierarchical level do not have to be processed (the process variable $P_2$ does not belong to a determined subset $S_i$). This is an example for the top-down-approach.

On the right side of FIG. 8 it is determined by a processing unit 5 that process variable $P_6$ does not belong to a determined subset $S_i$ and is consequently not processed. Consequently, all of the logical groups $6_3$, $6_4$, $6_5$, for which the processing unit 5 needs process variable $P_6$ as single input to determine the state of the logical group $6_3$, $6_4$, $6_5$ are not processed. This is an example for the bottom-up-approach.

The fact that a process variable $P_i$ or a logical group 6 is not processed is shown by shading.

It can be seen by comparing the two different X-Y planes (spaced along the Z axis) that out of the totality $\Pi$ of process variables $P_i$ and the totality of logical groups 6 only some process variables $P_i$ and some logical groups 6 are processed by the at least one processing unit 5, namely those process variables $P_i$ belonging to at least one determined subset $S_i$ and those logical groups 6 which have been selected as interesting or use only process variables $P_i$ belonging to at least one determined subset $S_i$ as input.

Figure 10A:
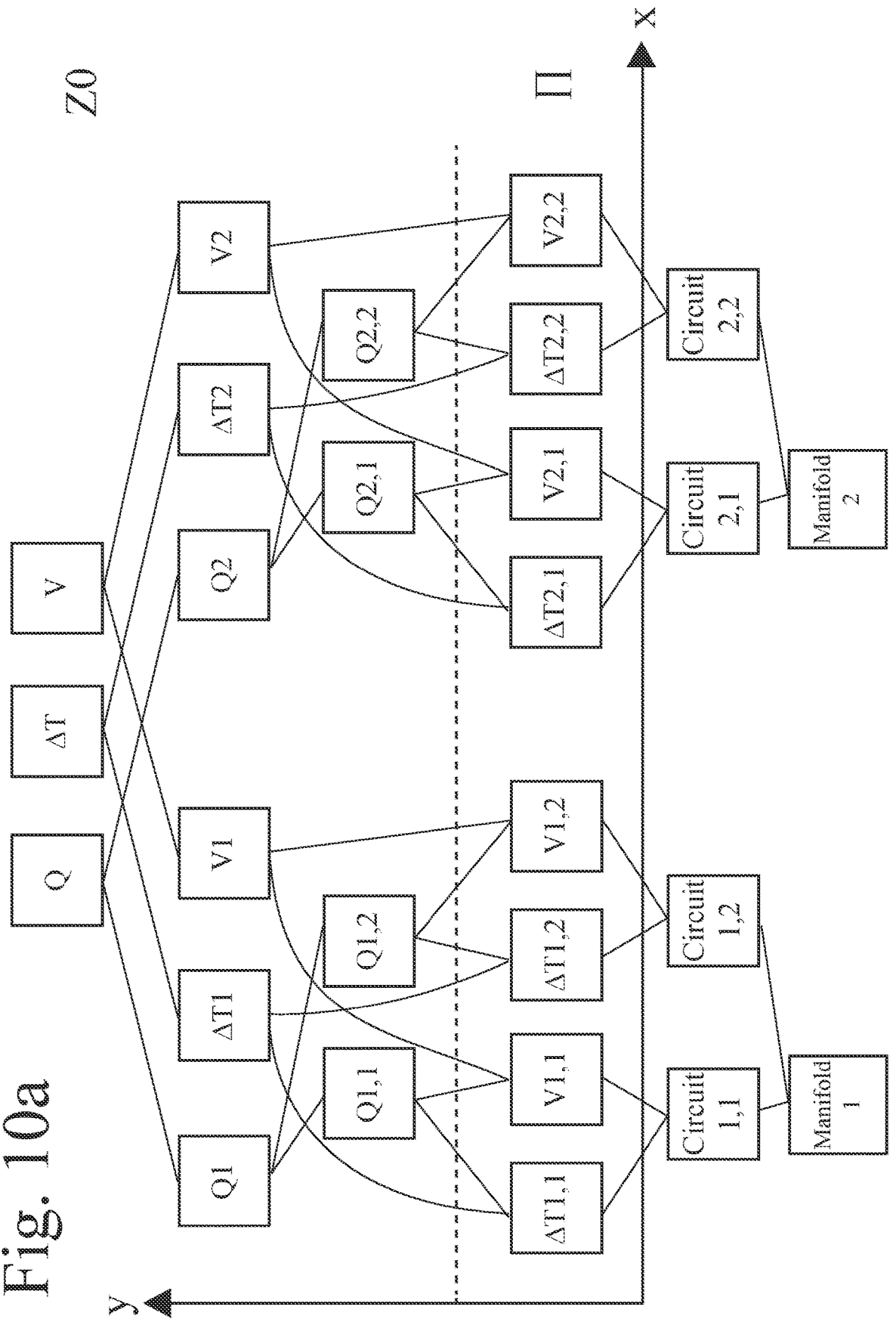
FIG. 10*a-d* shows a second example of the inventive method.
Figure 10B:
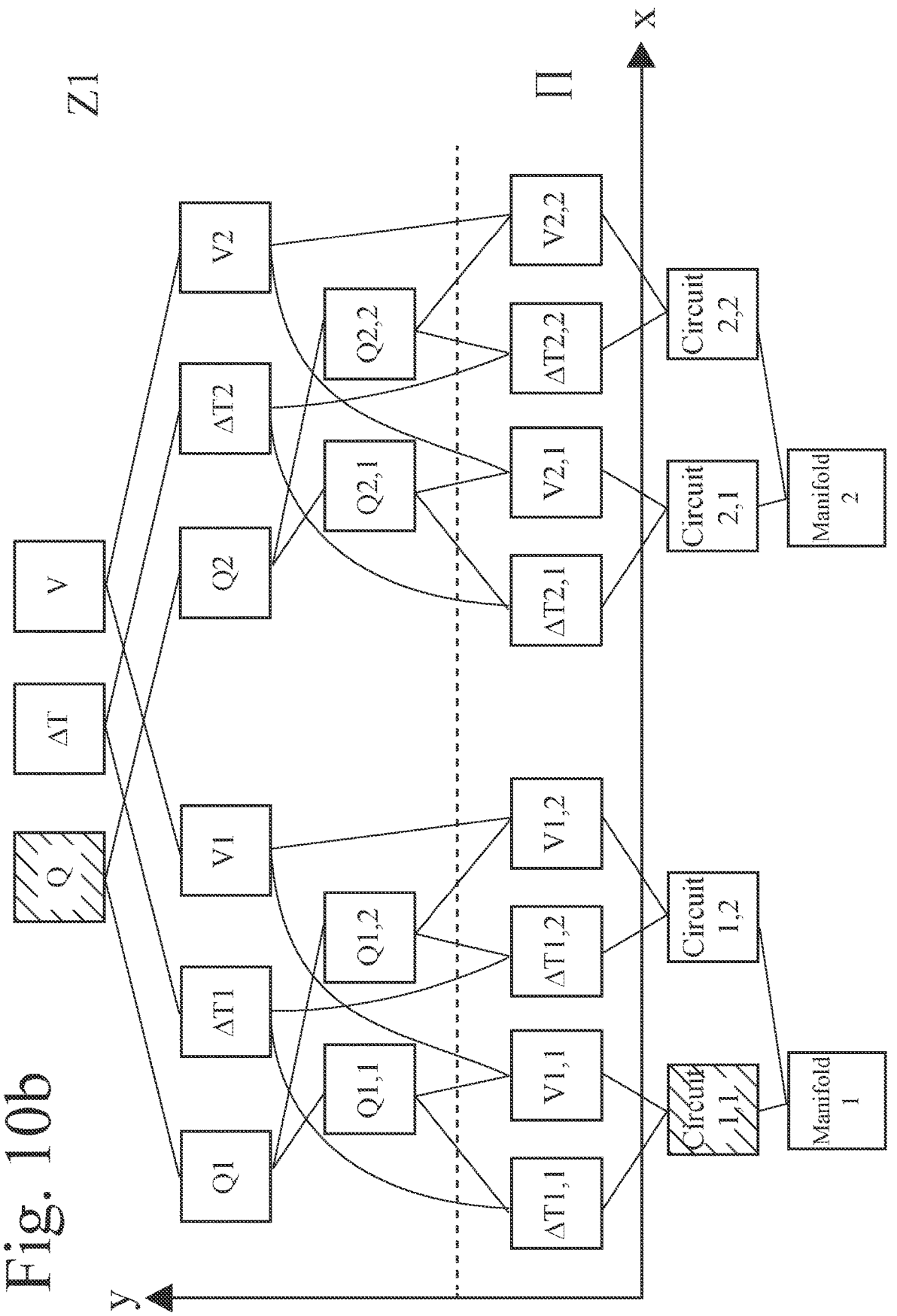
Figure 10C:
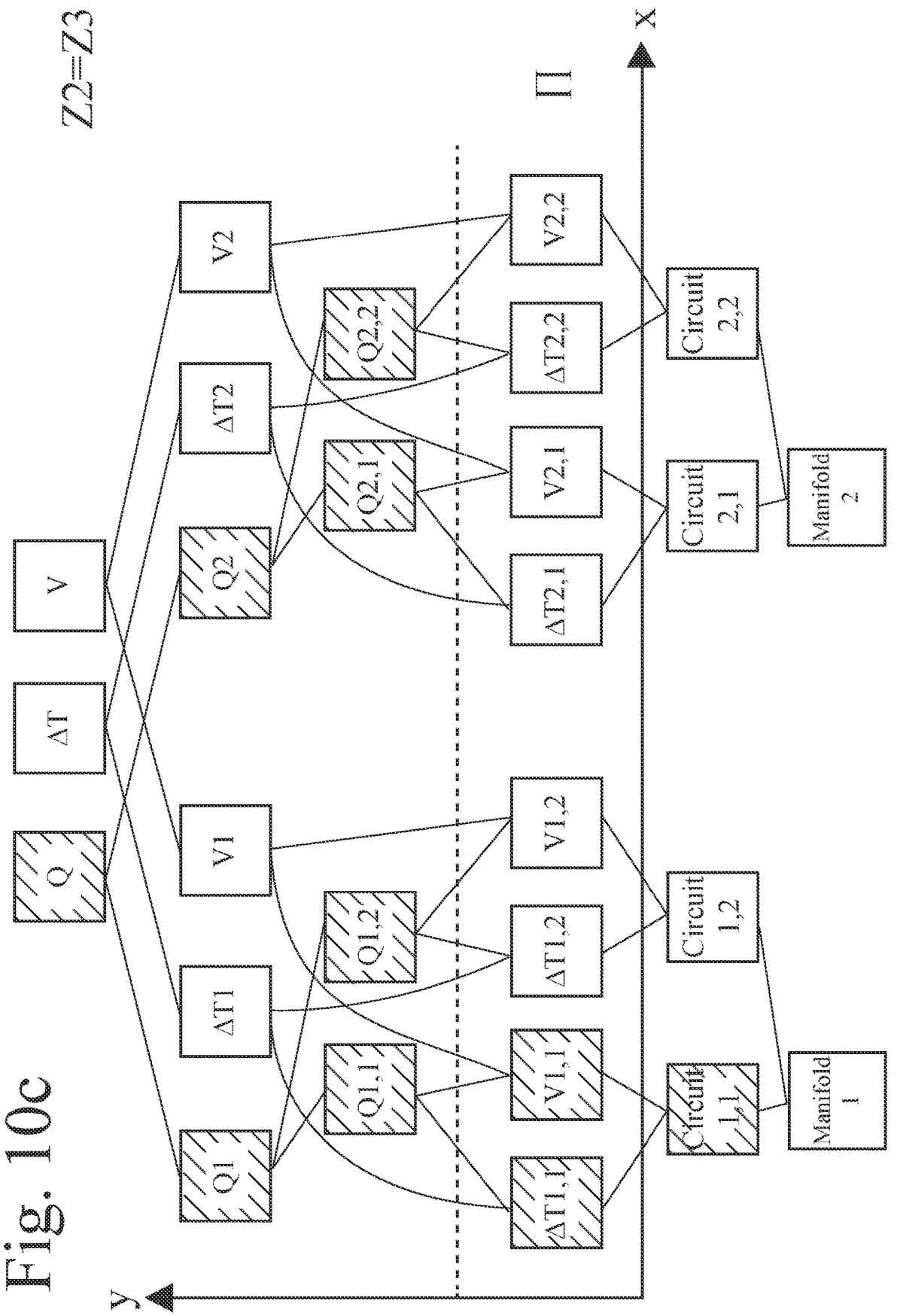
Figure 10D:
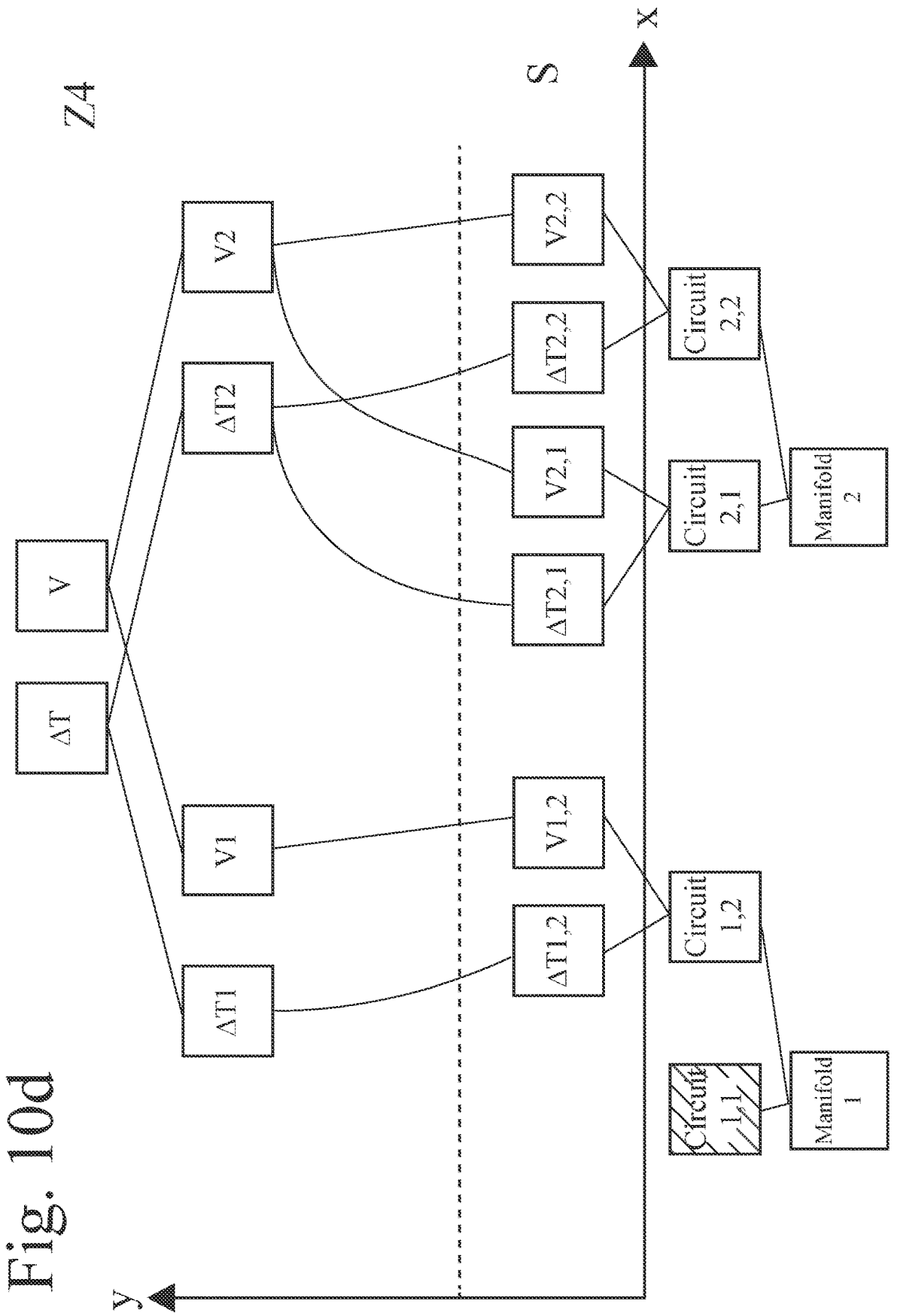
Figure 11:
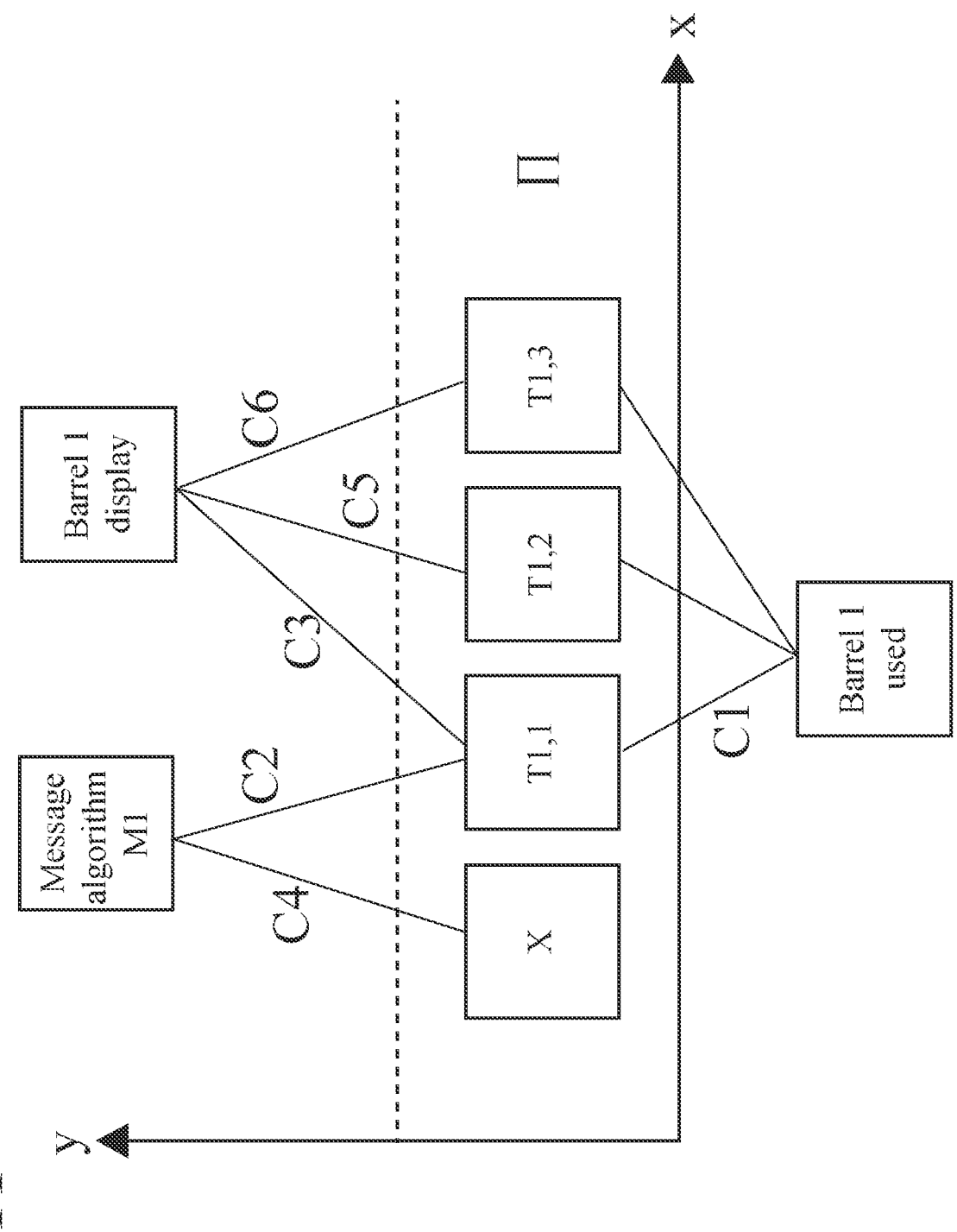
FIG. 11 shows a third example of the inventive method.

Further examples of embodiments of the invention are discussed with respect to FIGS. 9 to 11. The inventive concept is summarized with respect to FIG. 12.

FIG. 9 refers to a shaping machine with two injection units. Each one of FIGS. 9*a* to 9*e* shows a different plane with respect to the Z axis.

FIG. 9*a* (Z0):

Totality Π of process variables $P_i$ (three temperatures of each barrel, injection pressure in barrel1). The temperature signals will be processed by calculation of the mean values during each cycle. The temperature mean values are connected to the logical groups T_barrel1 and T_barrel2 which are connected to the logical group "T_barrels". Injection pressure p_inj T1,1mean and T1,2mean are members of the logical group "Viscosity change". This logical group represents an algorithm that can detect viscosity changes during production. Configuration variables barrel1used and barrel2used are shown below the X-axis.

FIG. 9*b* (Z1):

Barrel1 is not configured (not required for the specific production lot) and therefore the configuration variable Barrel2used is shown shaded. Monitoring the temperatures of barrel1 is not required (as determined by operator input, history of user behavior, . . . ) and therefore logical group T_barrel1 is shown shaded.

FIG. 9*c* (Z2):

The two different approaches as discussed before are shown, namely, on the left side the top-down-approach for reduction and on the right side the bottom-up-approach for reduction of process variables $P_i$ to be processed and logical groups to be used.

FIG. 9*d* (Z3)

On the right side a further bottom-up-approach to reduction with respect to the hierarchically ordered logical groups is shown.

FIG. 9*e* (Z4):

Shows those process variables $P_i$ which belong to a determined subset and which are therefore left for processing and the corresponding logical groups.

FIG. 10 refers to a production cell having two water manifolds for mold cooling of a shaping machine. Each one of FIGS. 10*a* to 10*d* shows a different plane with respect to the Z axis.

FIG. 10*a* (Z0):

Totality Π of process variables $P_i$: Each manifold supplies two circuits wherein the water flow rate and the water temperature difference between outlet and inlet of the mold is processed (measured or calculated). Configuration variables are shown below the x-axis.

FIG. 10*b* (Z1):

Circuit 1 of manifold 1 is not required for the mold, Heat flow rate Q is not required.

FIG. 10*c* (Z2 and Z3):

Illustration of top-down-approach to reduction and bottom-up-approach to reduction as with respect to FIG. 9. No further reduction across the $P_i$ level possible.

FIG. 10*d* (Z4):

Shows those process variables $P_i$ which belong to a determined subset and which are therefore left for processing and the corresponding logical groups.

FIG. 11 is used to discuss an example for determination whether a process variable $P_i$ is to be included in a subset in step (b).

Whether the process variable "T1,1" is to be included in a subset (and is therefore to be processed), can be decided based on a logic operation on connections C1-C3.

Connection C1 connects to configuration variable "Barrel 1 used".

Connection C2 connects to "Message algorithm M1"

Connection C3 connects to logical group "Barrel 1 display"

Therefore, for process variable "T1,1" to be processed, C1 must be active. Processing of process variable "T1,1" is only required if C2 and/or C3 are active. The corresponding logical operation in this example would be C1 AND (C2 OR C3).

Examples for evaluation of logical groups:

The evaluation of message algorithm M1 is only executed if the following logic operation is true: C2 AND C4 (both process variables X AND T1,1 are required)

The evaluation (i.e. display) of group "Barrel 1 display" only executes if the following logic operation is true: C3 OR C5 OR C6. (at least one process variable of T1,1 T1,2 T1,3 is required). During execution only active connections are considered.

Connections in this example can have two "directions" (up/down), i.e., one connection in the drawing can correspond to two connections in reality.

FIG. 12 shows an example in which a computer-implemented method for processing a plurality of process variables $P_i$ of a production cell 1 is used (here comprising, by way of example, three subunits 2), which comprises at least one shaping machine as a subunit 2 of the production cell 1, the method using at least one processing unit 5 and comprising at least the steps of:

a. for at least one subunit 2 of the production cell 1 (the at least one subunit 2 having a plurality of actuators 3 and sensors 4) providing to or determining by the at least one processing unit 5 a totality Π of process variables ($P_1$ to $P_{10}$) which is available for processing for the plurality of actuators 3 and/or sensors 4 of the at least one subunit 2 b. using the at least one processing unit 5 to determine at least one subset $S_i$ of process variables $P_i$ out of the totality H of process variables R; here, by way of example, determining subsets $S_1$, $S_2$ and $S_3$ comprising different numbers of process variables $P_i$ each c. processing, during production of a production lot, those process variables $P_i$ which belong to the determined at least one subset $S_i$ of process variables $P_i$ d. for those process variables $P_i$ which do not belong to any of the determined at least one subset $S_i$ of process variables $P_i$, processing a selected number of process variables $P_i$; here, by way of example a single process variable $P_7$ is selected

REFERENCE SIGNS AND TERMINOLOGY

1 production cell
2 subunit
3 actuator
4 sensor
5 processing unit
6 logical group
$m_i$ measurement value
$P_i$ process variable
Π totality of process variables
$S_i$ determined subset of process variables
C complement of $\cup_i S_i$
X axis along which different process variable or logical groups are arranged at one hierarchical level
Y axis along which different process variable or logical groups of different hierarchical levels are arranged
Z axis which groups process variable or logical groups based on their being processed or not and to which extent they are being processed Production Cell:

An arrangement of devices for production of products.

Subunit of a Production Cell:

At least one of the devices of a production cell.

Production Lot:

The totality of products which is produced in a given time span using a given production cell, preferably without changing a mold of the shaping machine, the totality of actuators of the production cell or the production material.

Measurement Value:

Value delivered by a sensor or a value determined on the basis of the signals delivered by the sensor, of a physical variable of the production cell, one of its subunits or the process material.

Process Variable:

Variable ascertained from a measurement value or values or a measurement value or values themselve(s); can be represented in the form of one or more key figures.

Processing a Process Variable:

The term "processing" is understood to encompass at least one of capturing or measuring data, executing data analysis (e.g., inspecting, transforming, modeling, interpreting, classifying or visualizing data) and outputting data for any kind of purpose.

Key Figure:

Variable ascertained from a process variable like for example properties of measurement curves; time at which measurement variables assume given values, and so forth.

Target Value:

Setting value for a subunit of the production cell.

Reference Value:

Value which is used for a comparison with a process variable.

Reference State:

Combination of reference values at a given time which characterizes the state of a subunit of the production cell or parts thereof at that time.

Relational Value:

Special form of a reference value, namely process variable stored at a operator-defined time for comparison with one or more process variables:

Tolerance:

Value (for example in the form of a band around a curve) which specifies from what deviation visualization and/or evaluation is affected.

Configuration of a Subunit of the Production Cell:

The selection of actuators and/or sensors used for the production of a production lot from the totality of actuators and/or sensors which is present in a given subunit of a production cell.

Configuration Variable:

Variable that shows if an actuator and or sensor is being used or not.

Processing Unit:

An entity of a processor that can independently read and execute program instructions. Each processing unit appears to the operating system as an independent processor that can be addressed in a parallel manner. Each processor provides at least one processing unit but modern processors have a plurality of cores (a core is an independent processing unit within a processor). Furthermore, each core can allow multi-threading, i.e., one physical core appears as multiple processing units to the operating system. It is to be understood that the term process encompasses CPUs, TPUs and GPUs.

Totality of Process Variables:

All process variables that can be ascertained from the measurement values (or can be in the form of a measurement value or values themselves) for the plurality of actuators and/or sensors of the at least one subunit or a static (i.e., not changing for a given configuration of a production cell) subset of process variables pre-selected therefrom.

Subset of Process Variables:

A set of process variables selected from the totality of process variables. The subset can encompass all of the process variables selected from the totality of process variables or, preferred, only some process variables selected from the totality of process variables.

Edge Device:

A device comprising a processing unit which connects subunits of a production cell or connects a production cell to an enterprise network or the cloud.

The invention claimed is:

1. A computer-implemented method for processing a plurality of process variables of a production cell which comprises at least one shaping machine as a subunit of the production cell, wherein the process variables of the plurality of process variables are ascertained from a measurement value or values or constitute a measurement value or values, the method using at least one processing unit and comprising:

a. for at least one subunit of the production cell, the at least one subunit being the at least one shaping machine and having a plurality of actuators and/or sensors, providing to the at least one processing unit a totality of process variables which is available for processing b. using at least one processing unit to determine at least one subset of process variables out of the totality of process variables c. processing those process variables which belong to the determined at least one subset of process variables d. for those process variables which do not belong to any of the determined at least one subset of process variables, processing a selected number of process variables, whereby this number is smaller than the number of the totality of process variables minus the number of process variables belonging to any of the determined at least one subset of process variables such that the required processing capacity for the at least one processing unit to process the totality of process variables is reduced, wherein processing encompasses at least one of capturing or measuring data, executing data analysis and outputting data, wherein in step (c) processing process variables comprises capturing or measuring process variables in form of measurement values, or calculating values or properties of process variables over time derived from at least one process variable, or generating signals to be provided by the method to an operator, or executing data analysis, or storing values or properties of process variables over time, or storing calculated values or generated signals, or outputting values or properties of process variables over time, or outputting calculated values or generated signals or a combination thereof, wherein at least one process variable, which do not belong to any of the determined at least one subset but is processed, is processed at a lower frequency than those process variables which belong to at least one of the determined at least one subset, wherein at least one of the group of values, properties of process variables over time, calculated values and generated signals is outputted with reduced communication bandwidth to a display device.

2. A computer-implemented method for processing a plurality of process variables of a production cell which comprises at least one shaping machine as a subunit of the production cell, wherein the process variables of the plurality of process variables are ascertained from a measurement value or values or constitute a measurement value or values, the method using at least one processing unit and comprising:

a. for at least one subunit of the production cell, the at least one subunit being the at least one shaping machine and having a plurality of actuators and/or sensors, providing to the at least one processing unit a totality of process variables which is available for processing b. using at least one processing unit to determine at least one subset of process variables out of the totality of process variables c. processing those process variables which belong to the determined at least one subset of process variables d. for those process variables which do not belong to any of the determined at least one subset of process variables, processing a selected number of process variables, whereby this number is smaller than the number of the totality of process variables minus the number of process variables belonging to any of the determined at least one subset of process variables such that the required processing capacity for the at least one processing unit to process the totality of process variables is reduced, wherein processing encompasses at least one of capturing or measuring data, executing data analysis and outputting data, wherein in step (c) processing process variables comprises capturing or measuring process variables in form of measurement values, or calculating values or properties of process variables over time derived from at least one process variable, or generating signals to be provided by the method to an operator, or executing data analysis, or storing values or properties of process variables over time, or storing calculated values or generated signals, or outputting values or properties of process variables over time, or outputting calculated values or generated signals or a combination thereof, wherein at least some process variables are associated with at least one logical group, wherein there are provided at least two different logical groups, wherein the value of a plurality of process variables is processed and for each logical group a state of the logical group is evaluated by the at least one processing unit on the basis of the process variables associated with said logical group, wherein the state is visualized by means of a display device and the state is evaluated only for those logical groups for which all of the process variables necessary to evaluate the state belong to at least one of the at least one determined subset of process variables.

3. The computer-implemented method according to claim 2, wherein the production cell comprises, in addition to the at least one shaping machine, at least one further subunit in the form of at least one of the following:

at least one other shaping machine at least one mold mounted on the at least one shaping machine at least one handling device at least one periphery device.

4. The computer-implemented method according to claim 2, wherein in step (b) the at least one processing unit determines at least one of the at least one subset of process variables based on at least one of the following:

configuration of the at least one subunit of the production cell history of the at least one subunit of the production cell configuration and/or history of a plurality of other production cells physical or logical dependencies of values derived from at least one process variable and/or signals to be provided by the method to an operator operator input.

5. The computer-implemented method according to claim 2, wherein in step (d), which belong to the selected number of process variables, processing a selected number of process variables comprises:

capturing or measuring process variables in form of measurement values, and/or calculating values or properties of process variables over time derived from at least one process variable, and/or generating signals to be provided by the method to an operator, and/or executing data analysis, and/or storing values or properties of process variables over time, and/or storing calculated values and/or generated signals outputting values or properties of process variables over time, and/or outputting calculated values and/or generated signals.

6. The computer-implemented method according to claim 2, wherein in step (d) the number of process variables which do not belong to any of the determined at least one subset of process variables, but are processed, comprises at least one process variable which is:

processed at a lower frequency than those process variables which belong to at least one of the determined at least one subset, and/or observed by at least one processing unit to decide whether it should be included in an updated version of at least one of the determined at least one subset.

7. The computer-implemented method according to claim 2, wherein in step (d) the number of process variables which do not belong to any of the determined at least one subset of process variables, but are processed, is selected according to at least one of the following criteria:

values of configuration variables history of determined subsets of process variables for this production cell and/or other production cells history of generated signals which were provided by the method to an operator for this production cell and/or other production cells.

8. The computer-implemented method according to claim 2, wherein the at least one shaping machine is a cyclically operating machine or a continuously operating machine.

9. The computer-implemented method according to claim 2, wherein at least one of the at least one processing unit is comprised by:

an edge device a control unit of one of the subunits of the production cell or of the production cell a central server of a production site containing the production cell a stationary or mobile computing device a cloud computing device.

10. The computer implemented method according to claim 2, wherein:

at least some process variables are associated with at least one logical group, wherein there are provided at least two different logical groups.

11. The computer implemented method according to claim 10, wherein in step (b) the at least one processing unit determines at least some of the process variables of the at least one subset of process variables out of the totality of process variables on basis of the logical structure given by the logical groups.

12. The computer implemented method according to claim 11, wherein the at least one processing unit determines at least some of the process variables of the at least one subset of process variables such that all process variables belonging to a logical group are included in the at least one subset.

13. The computer implemented method according to claim 11, wherein, continuously or in time-discrete relationship, the value of a plurality of process variables is processed, and for each logical group a state of the logical group is evaluated by the at least one processing unit on the basis of the process variables associated with said logical group, and wherein the state of logical groups is evaluated only for those logical groups for which all of the process variables necessary to evaluate their state belong to at least one of the at least one subset of process variables.

14. The computer implemented method according to claim 13, wherein in order to evaluate the state of a logical group the respective current value of each process variable or a variable derived therefrom is compared to one or more reference values by means of at least one processing unit and a deviation or a rate of change is determined.

15. A production cell comprising at least one shaping machine as a subunit having a plurality of actuators and/or sensors, the production cell comprising or being in connection with at least one processing unit, the at least one processing unit being configured to carry out the method according to claim 2.

16. A non-transitory computer-readable storage medium storing a program which when it is executed by a computer having at least one processing unit causes the computer to carry out the method according to claim 2.

17. The computer implemented method according to claim 2, wherein in step (c) processing process variables occurs during production of a production lot.

18. The computer-implemented method according to claim 8, wherein the at least one shaping machine is an injection-molding machine, an injection press, or a compounder or an extruder.

19. The computer implemented method according to claim 10, wherein:

each process variable is associated with at least one logical group, wherein there are provided at least two different logical groups, and it is provided that logical groups are arranged in at least two hierarchy levels in such a way that at least one logical group of a lower hierarchy level is associated with another logical group of a higher hierarchy level.

20. The computer implemented method according to claim 11, wherein in step (b) the at least one processing unit determines at least some of the process variables of the at least one subset of process variables out of the totality of process variables on basis of the logical structure given by the hierarchical levels of logical groups.

21. The computer implemented method according to claim 13, wherein the value of a plurality of process variables is processed, and visualised by means of a display device.

22. A computer-implemented method for processing a plurality of process variables of a production cell which comprises at least one shaping machine as a subunit of the production cell, wherein the process variables of the plurality of process variables are ascertained from a measurement value or values or constitute a measurement value or values, the method using at least one processing unit and comprising:

a. for at least one subunit of the production cell, the at least one subunit being the at least one shaping machine and having a plurality of actuators and/or sensors, providing to the at least one processing unit a totality of process variables which is available for processing b. using at least one processing unit to determine at least one subset of process variables out of the totality of process variables c. processing those process variables which belong to the determined at least one subset of process variables d. for those process variables which do not belong to any of the determined at least one subset of process variables, processing a selected number of process variables, wherein processing encompasses at least one of capturing or measuring data, executing data analysis and outputting data, wherein in step (c) processing process variables comprises capturing or measuring process variables in form of measurement values, or calculating values or properties of process variables over time derived from at least one process variable, or generating signals to be provided by the method to an operator, or executing data analysis, or storing values or properties of process variables over time, or storing calculated values or generated signals, or outputting values or properties of process variables over time, or outputting calculated values or generated signals or a combination thereof, wherein at least some process variables are associated with at least one logical group, wherein there are provided at least two different logical groups, wherein the at least two different logical groups are arranged in at least two hierarchy levels in such a way that least one logical group of a lower hierarchy level is associated with another logical group of a higher hierarchy level, wherein the value of a plurality of process variables is processed and for each logical group a state of the logical group is evaluated by the at least one processing unit on the basis of the process variables associated with said logical group, wherein for those process variables which do not belong to any of the determined at least one subset of process variables, processing a selected number of process variables, whereby this number is smaller than the number of the totality of process variables minus the number of process variables belonging to any of the determined at least one subset of process variables or zero, wherein by virtue of the at least one processing unit at least one logical group is determined to be not processed and all logical groups connected across the hierarchical levels by their assignment to the at least one logical group are determined to be not processed such that the required process capacity for the at least one processing unit to process the totality of process variables is reduced, wherein the state is visualized by means of a display device and the state is evaluated only for those logical groups for which all of the process variables necessary to evaluate the state belong to at least one of the at least one determined subset of process variables.

\* \* \* \* \*